(12) United States Patent
Koh

(10) Patent No.: US 7,837,473 B2
(45) Date of Patent: Nov. 23, 2010

(54) SURGICAL TRAINING DEVICE AND METHOD

(76) Inventor: Charles H. Koh, 3E12630 N. Lake Shore Dr., Mequon, WI (US) 53092

( * ) Notice: Subject to any disclaimer, the term of this patent is extended or adjusted under 35 U.S.C. 154(b) by 681 days.

(21) Appl. No.: 11/402,288

(22) Filed: Apr. 11, 2006

(65) Prior Publication Data
US 2007/0238081 A1 Oct. 11, 2007

(51) Int. Cl.
G09B 23/28 (2006.01)

(52) U.S. Cl. ........................... 434/262; 434/272

(58) Field of Classification Search ............ 434/262, 434/267
See application file for complete search history.

(56) References Cited

U.S. PATENT DOCUMENTS

| | | | |
|---|---|---|---|
| 5,358,408 A | | 10/1994 | Medina |
| 5,368,487 A | | 11/1994 | Medina |
| 5,403,191 A | * | 4/1995 | Tuason ..................... 434/262 |
| 5,620,326 A | | 4/1997 | Younker |
| 5,722,836 A | * | 3/1998 | Younker ..................... 434/272 |
| 5,775,916 A | | 7/1998 | Cooper et al. |
| 5,791,907 A | | 8/1998 | Ramshaw et al. |
| 5,947,743 A | * | 9/1999 | Hasson ..................... 434/262 |
| 5,951,301 A | | 9/1999 | Younker |
| 6,336,812 B1 | | 1/2002 | Cooper et al. |
| 6,517,354 B1 | * | 2/2003 | Levy ..................... 434/262 |
| 6,540,679 B2 | * | 4/2003 | Slayton et al. ............ 600/439 |
| 6,659,776 B1 | * | 12/2003 | Aumann et al. ............ 434/262 |
| 6,887,082 B2 | | 5/2005 | Shun |
| 7,594,815 B2 | * | 9/2009 | Toly ..................... 434/262 |
| 2004/0140951 A1 | * | 7/2004 | Blish et al. ................ 345/163 |
| 2004/0142315 A1 | | 7/2004 | Bumann et al. |
| 2005/0064378 A1 | * | 3/2005 | Toly ..................... 434/262 |
| 2005/0075558 A1 | | 4/2005 | Vecerina et al. |
| 2005/0084833 A1 | * | 4/2005 | Lacey et al. ............... 434/262 |

OTHER PUBLICATIONS

Laparoscopy Today, vol. 3, No. 2, pp. 5-32, 2004.
Koh, Charles H., Laparoscopic Suturing in the Vertical Zone, pp. 3-63, 2004.

* cited by examiner

Primary Examiner—Cameron Saadat
(74) Attorney, Agent, or Firm—Greenberg Traurig, LLP

(57) ABSTRACT

A surgical training device and method. The surgical training device can include a portable case including a base and a lid. The surgical training device can include a support coupled to the base, and the support can be moveable from a first position stored within the base to a second position coupled to the lid. The support can include a plurality of ports positioned so that when the support is in the second position, the surgical instruments inserted into the plurality of ports are substantially horizontal and parallel to the base. The surgical training device can include a camera and a video monitor connected to the camera. The video monitor can display an output from the camera including the surgical instruments and/or simulated tissue.

10 Claims, 9 Drawing Sheets

SURGICAL TRAINING DEVICE AND METHOD

BACKGROUND OF THE INVENTION

Surgical training devices have been developed to help teach students how to suture and perform other surgical techniques in a video laparoscopic environment. As opposed to a fully invasive surgical environment in which the surgeon can directly view the patient's internal organs and the surgical instruments, a video laparoscopic environment uses a video camera inserted into the patient through a trocar and connected to a video monitor. The surgeon accesses the patient's internal organs with laparoscopic instruments inserted through ports in the patient's abdomen. The surgeon relies only on a two-dimensional image of the laparoscopic instruments and the patient's internal organs as viewed through the video monitor to perform suturing and other surgical techniques.

Students must be trained using cadavers, animal specimens, or surgical training devices in order to learn to perform basic suturing and other surgical techniques in a video laparoscopic environment. Conventional laparoscopic surgical training devices include curved or flat structures in which the entry ports cause the laparoscopic instruments to be inserted vertically downward. This causes a fulcrum effect that influences surgical dexterity and accuracy.

SUMMARY OF THE INVENTION

A need exists for a surgical training device including side ports that allow instruments to enter horizontally or at a near horizontal position and that enables two-handed surgery to be performed from one side of the patient with relaxed elbow, forearm, and hand position.

Some embodiments of the invention provide a surgical training device including a portable case having a base and a lid. The surgical training device can include a support coupled to the base, and the support can be moveable from a first position stored within the base to a second position coupled to the lid. The support can include a plurality of ports positioned so that when the support is in the second position, the surgical instruments inserted into the plurality of ports are substantially horizontal and parallel to the base. The surgical training device can include a camera and a video monitor connected to the camera. The video monitor can display an output from the camera including the surgical instruments and/or simulated tissue.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

Some embodiments of the invention can be used to teach a suturing style called the VERTICAL ZONE®, which differs from other suturing techniques because the needle rotates in the sagittal plane of the patient's body. From the vantage point of the laparoscope, the needle appears to be traversing from top to bottom vertically (surgeon on right side of patient) or from bottom to top (surgeon on left side of patient). All other suturing styles employ central port positions where the needle traverses from side-to-side and where each suturing motion is inconsistent. The VERTICAL ZONE® technique specifies port positions that allow a horizontal attitude of the needle holder shaft, which then rotates axially to move the needle in the sagittal plane. This axial rotary movement totally eliminates the pivot effect of the trocar. The act of needle driving is constant and always starts from the top, moving vertically downwards. The surgeon throws knots from a two-handed ipsilateral position, always using the same motion. The arms and elbows are totally relaxed in this style of stuturing, which closely resembles open laparotomy. The port positions, suturing style, and closely-choreographed technique all comprise laparoscopic suturing in the VERTICAL ZONE®, as further described in "Laparoscopic Suturing in the Vertical Zone™" by Dr. Charles H. Koh, 2004 Endo-Press™, the entire contents of which is herein incorporated by reference. The constancy of choreography in the technique allows for successful acquisition of skill by residents, fellows, and others.

Figure 1A:
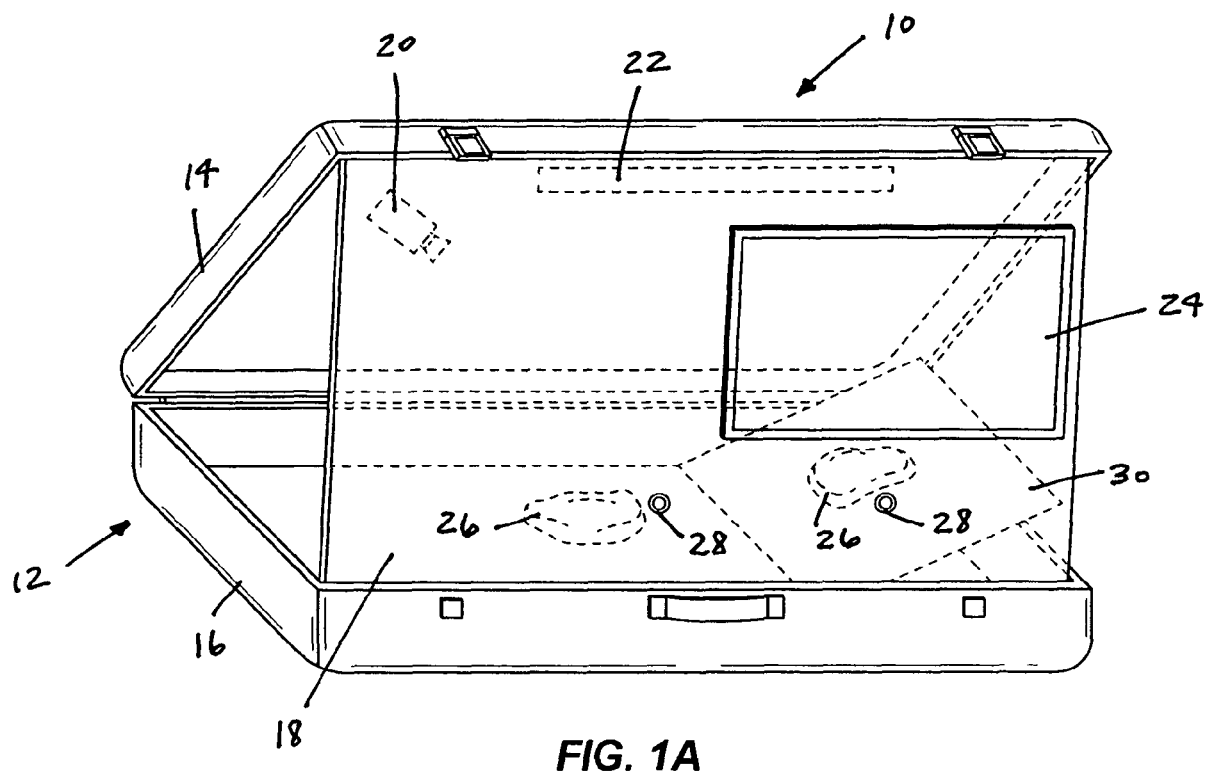
FIG. 1A is a perspective view of a surgical training device according to one embodiment of the invention.
Figure 1B:
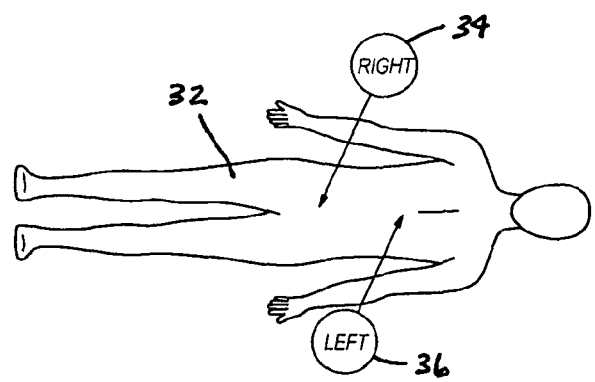
FIG. 1B is a schematic view of a surgeon's position with respect to a patient for the surgical training device of FIG. 1A.

FIG. 1A illustrates a surgical training device 10 according to one embodiment of the invention. The surgical training device 10 can include a case 12 having a lid 14 and a base 16. In some embodiments, the case 12 is a folding portable briefcase that can integrate all of the components necessary for a student to practice suturing and other surgical techniques by himself or herself. The surgical training device 10 can include a diagonal support 18, a camera 20, a light source 22, a video monitor 24, a simulated specimen 26, and ports 28. In some embodiments, the surgical training device 10 can include a platform 30 that can be used to elevate the simulated specimen 26. FIG. 1B illustrates a surgeon's positions with respect to a patient 32 as simulated by the surgical training device 10. The surgical training device 10 can simulate a laparoscopic surgeon 34 being positioned on the patient's right side for operating on the pelvis using the VERTICAL ZONE® technique or a general surgeon 36 being positioned on the patient's left side and operating on the upper abdomen. The surgical training device 10 can simulate a two-handed ipsilateral surgical position.

Figure 2A:
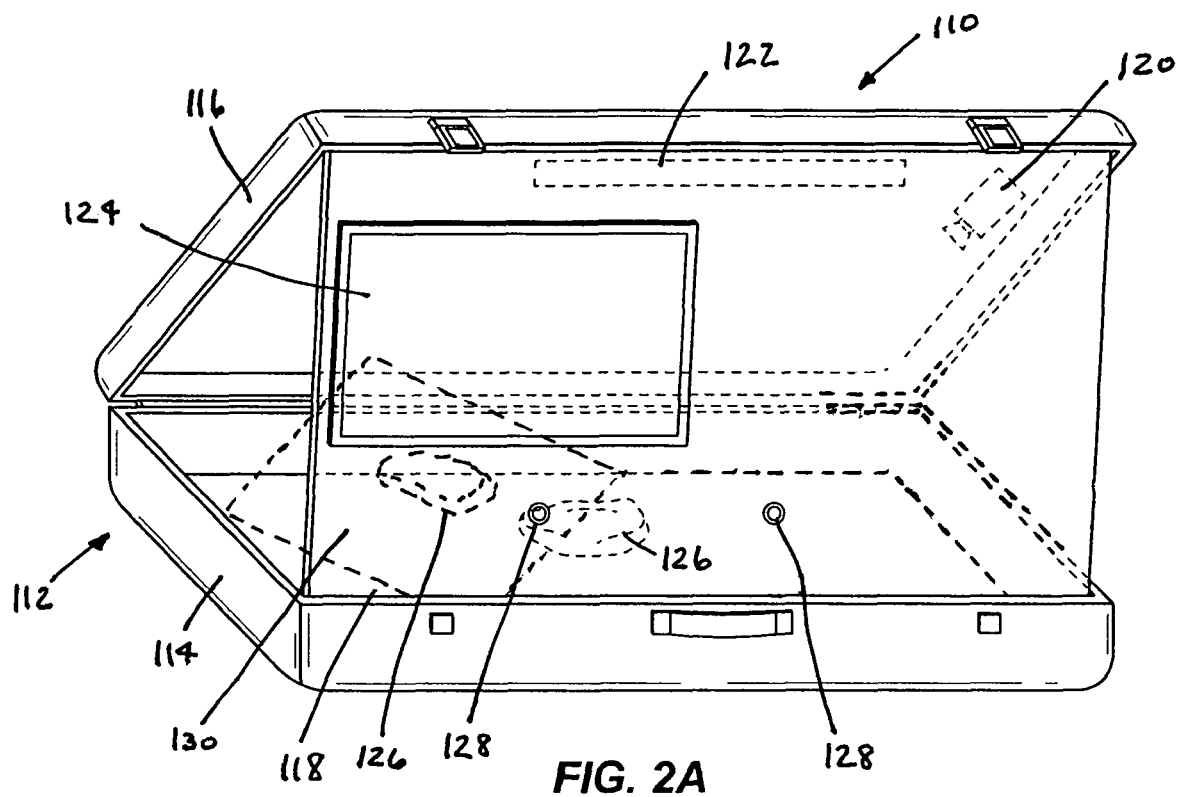
FIG. 2A is a perspective view of a surgical training device according to another embodiment of the invention.
Figure 2B:
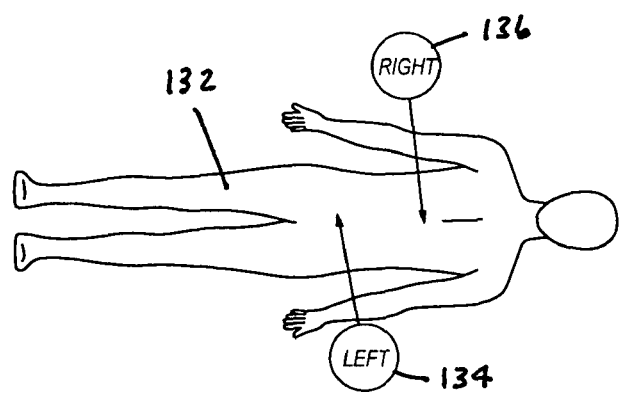
FIG. 2B is a schematic view of a surgeon's position with respect to a patient for the surgical training device of FIGS. 2A and 2C.

FIG. 2A illustrates a surgical training device 110 according to another embodiment of the invention. The surgical training device 110 can include a case 112 having a base 114 and a lid 116. The surgical training device 110 can include a diagonal support 118, a camera 120, a light source 122, a video monitor 124, a simulated specimen 126, and ports 128. In some embodiments, the surgical training device 110 can include a platform 130 that can be used to elevate the simulated specimen. FIG. 2B illustrates a surgeon's positions with respect to a patient 132 as simulated by the surgical training device 110. The surgical training device 110 can simulate a laparoscopic surgeon 134 being positioned on the patient's left side for operating on the pelvis using the VERTICAL ZONE® technique or a general surgeon 136 being positioned on the patient's right side and operating on the upper abdomen. The surgical training device 110 can simulate a two-handed ipsilateral surgical position.

Figure 2C:
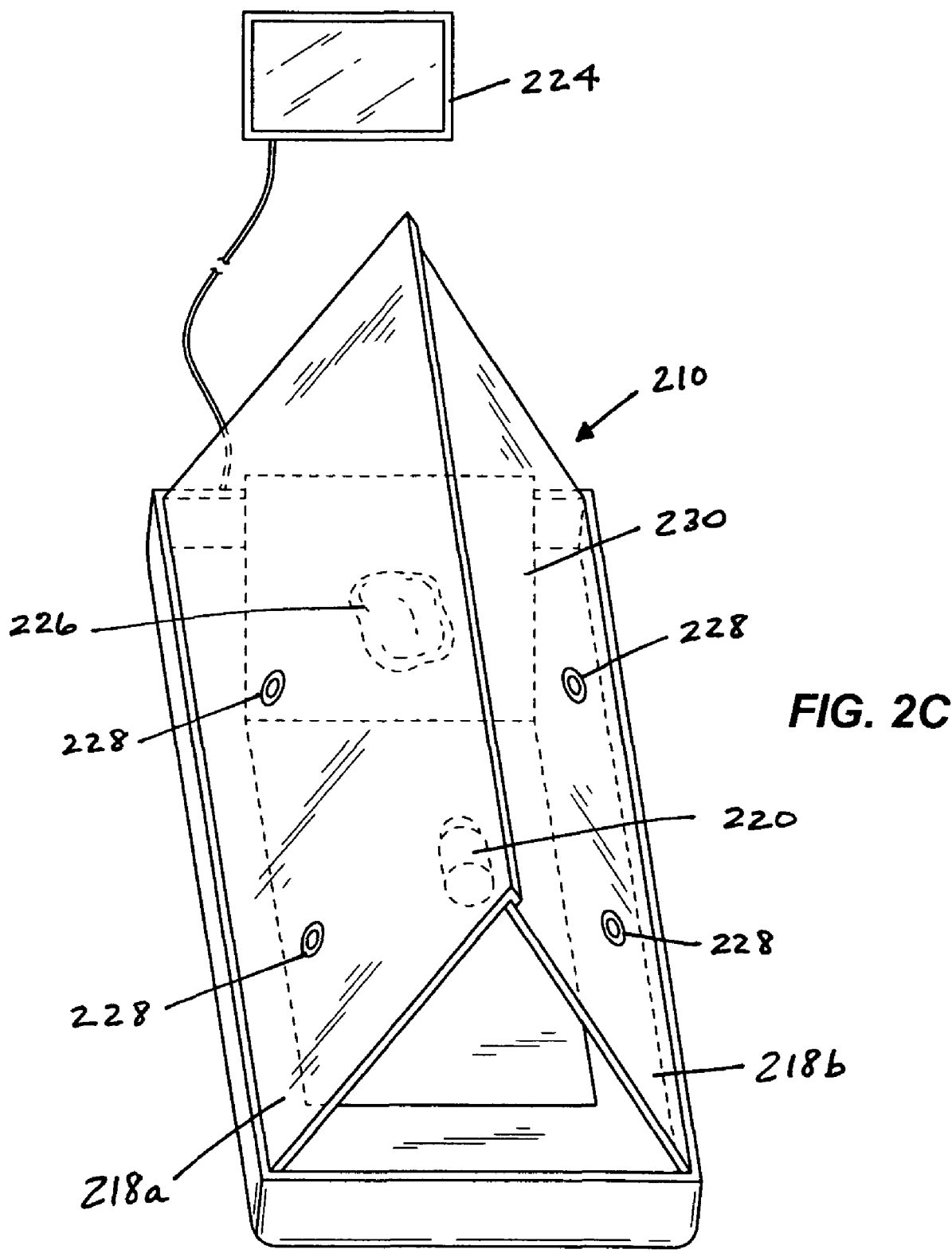
FIG. 2C is a perspective view of a surgical training device according to another embodiment of the invention.

FIG. 2C illustrates a composite surgical training device 210 according to another embodiment of the invention. The composite surgical training device 210 can combine the surgical training devices 10 and 110 into a single training device. The composite surgical training device 210 can include a first diagonal support 218a including two ports 228 and a second diagonal support 218b including another two ports 228. A video monitor 224 can be coupled to the composite surgical training device 210 so that it can be moved and/or swiveled toward the student. A camera 220 can be positioned toward an apex of the first diagonal support 218a and the second diagonal support 218b. In some embodiments, a platform 230 can support a simulated specimen 226.

Figure 3A:
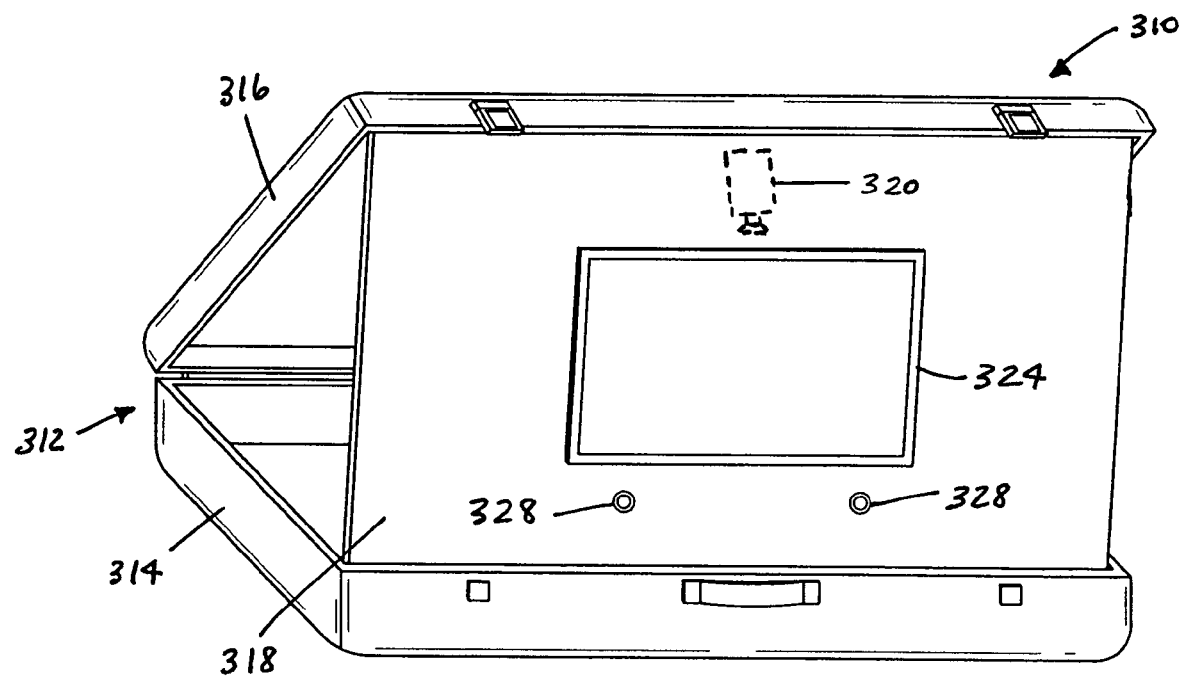
FIG. 3A is a perspective view of a surgical training device according to another embodiment of the invention.
Figure 3B:
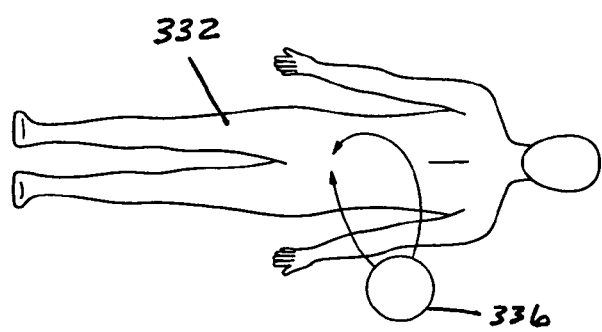
FIG. 3B is a schematic view of a surgeon's position with respect to a patient for the surgical training device of FIG. 3A.

FIG. 3A illustrates a surgical training device 310 according to another embodiment of the invention. The surgical training device 310 can include a case 312 having a base 314 and a lid 316. The surgical training device 310 can include a diagonal support 318, a camera 320, a light source (not shown), a video monitor 324, a simulated specimen (not shown), and ports 328. FIG. 3B illustrates a surgeon's positions with respect to a patient 332 as simulated by the surgical training device 310. The surgical training device 310 can simulate a surgeon 336 being positioned on the patient's left or right side for operating on the pelvis in a two-handed contralateral surgical position.

Figure 4A:
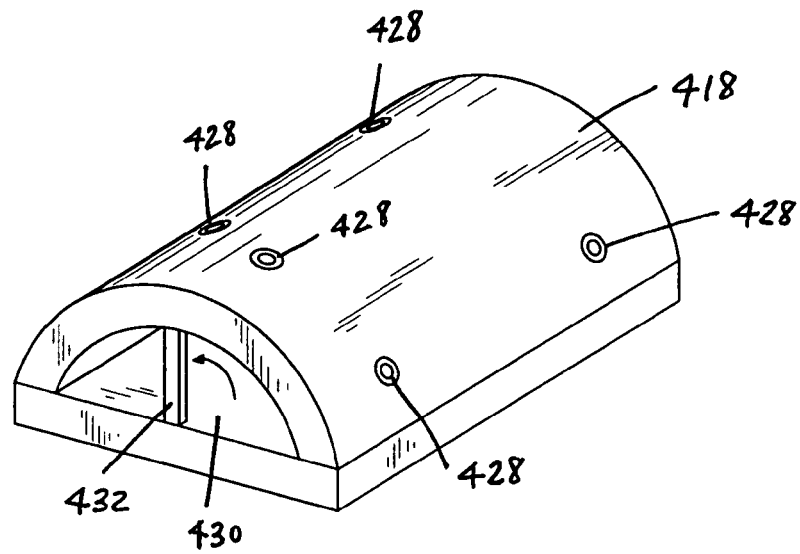
FIGS. 4A and 4B are perspective views of a surgical training device according to another embodiment of the invention.
Figure 4B:
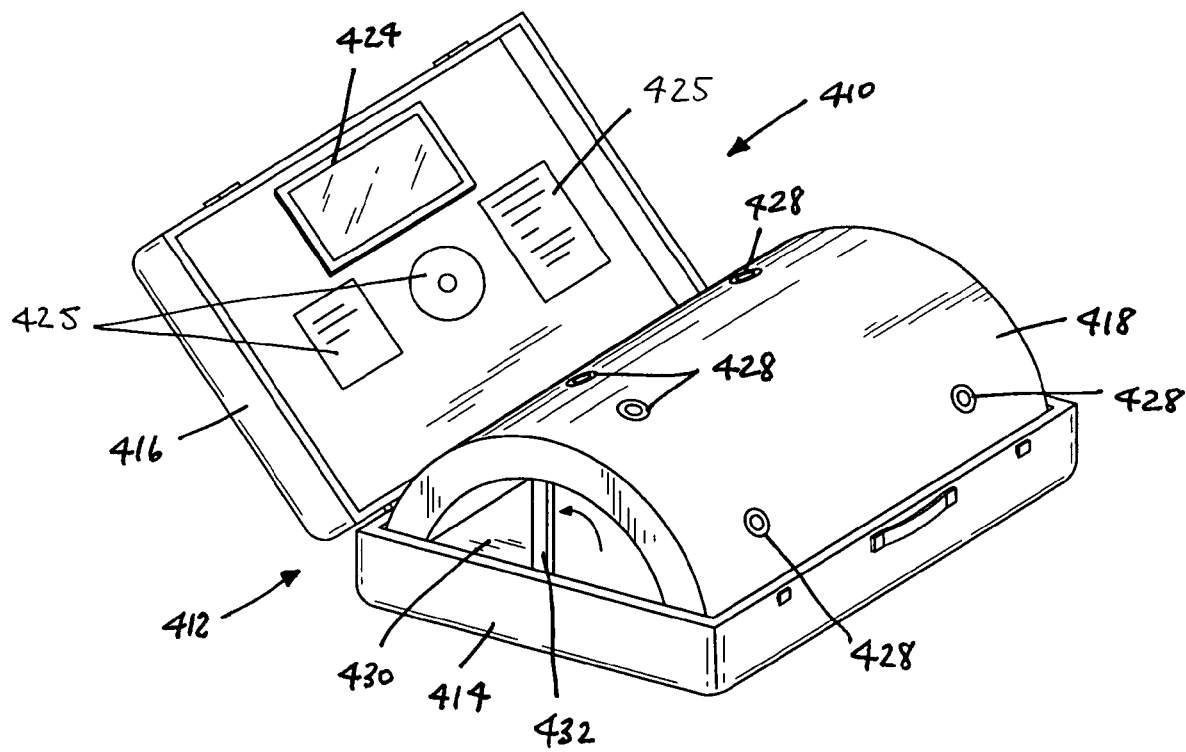

FIGS. 4A and 4B illustrate a surgical training device 410 according to another embodiment of the invention. The surgical training device 410 can include a case 412 having a base 414 and a lid 416. A hinge can be on the longer or shorter side of the base. The surgical training device 410 can include a domed support 418, a camera (not shown), a light source (not shown), a video monitor 424, instructions and/or storage compartments 425, a simulated specimen (not shown), and ports 428. The simulated specimen or exercise objects can be inserted in a space 430 below the domed support 418. In some embodiments, the domed support 418 can be held upright by one or more posts 432. In one embodiment, the domed support 418 can be constructed of neoprene, plastic, latex, or another suitable membrane material.

Figure 5A:
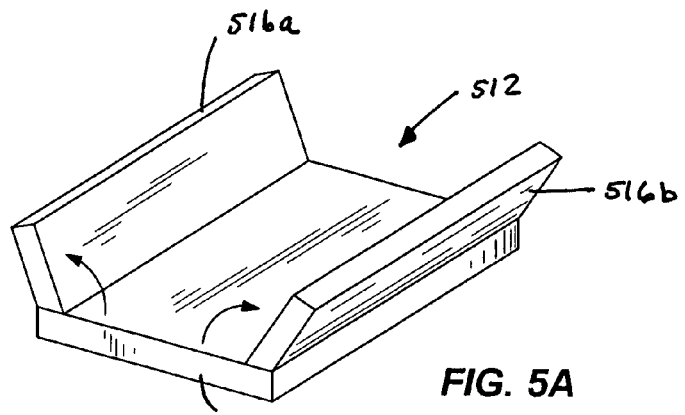
FIGS. 5A-5D are perspective views of a surgical training device according to another embodiment of the invention.
Figure 5B:
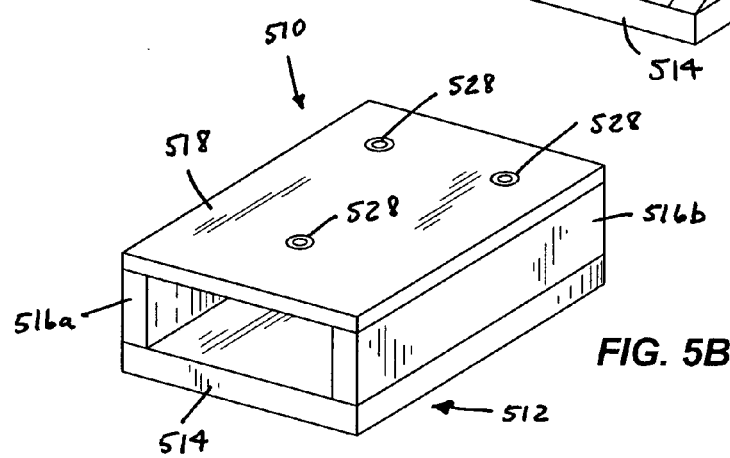
Figure 5C:
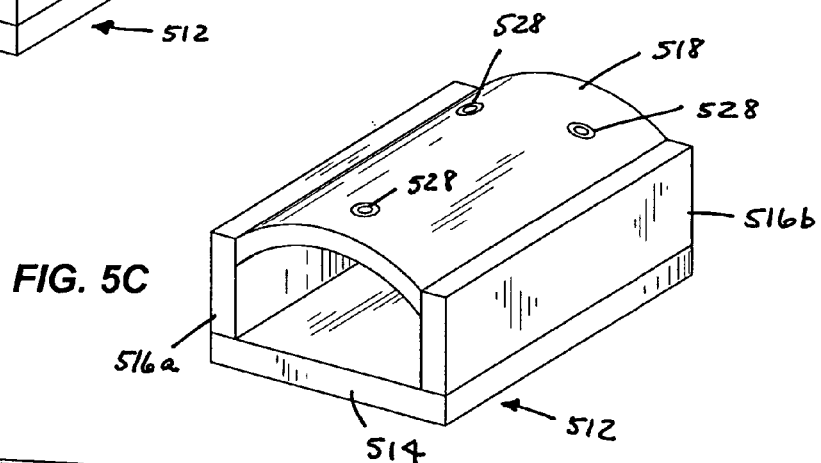
Figure 5D:
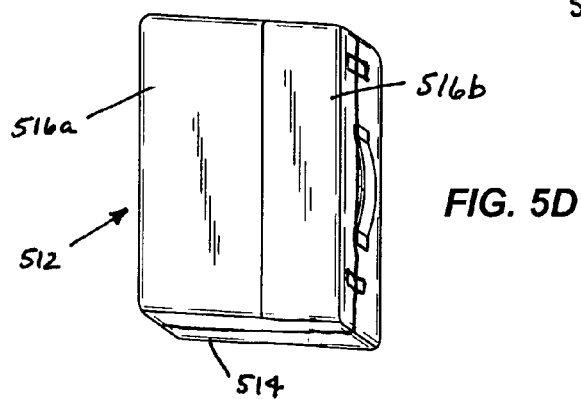

FIGS. 5A-5D illustrate a surgical training device 510 according to another embodiment of the invention. The surgical training device 510 can include a case 512 having a base 514 and a lid 516. As shown in FIG. 5A, the lid 516 can include a first section 516a and a second section 516b, which can be opened about hinges. The top edges of the first section 516a and the second section 516b can be coupled to a flat support 518 (as shown in FIG. 5B) or a domed support 518 (as shown in FIG. 5C), either of which can be constructed at least partially of neoprene. Ergonomic ports for the VERTICAL ZONE® suturing technique can be included in the sections 516a and 516b, in addition to the ports 528. The surgical training device 510 can include a camera (not shown), a light source (not shown), a video monitor (not shown), a simulated specimen (not shown), and ports 528. The simulated specimen or exercise objects can be inserted in a space below the domed support 518.

Figure 6:
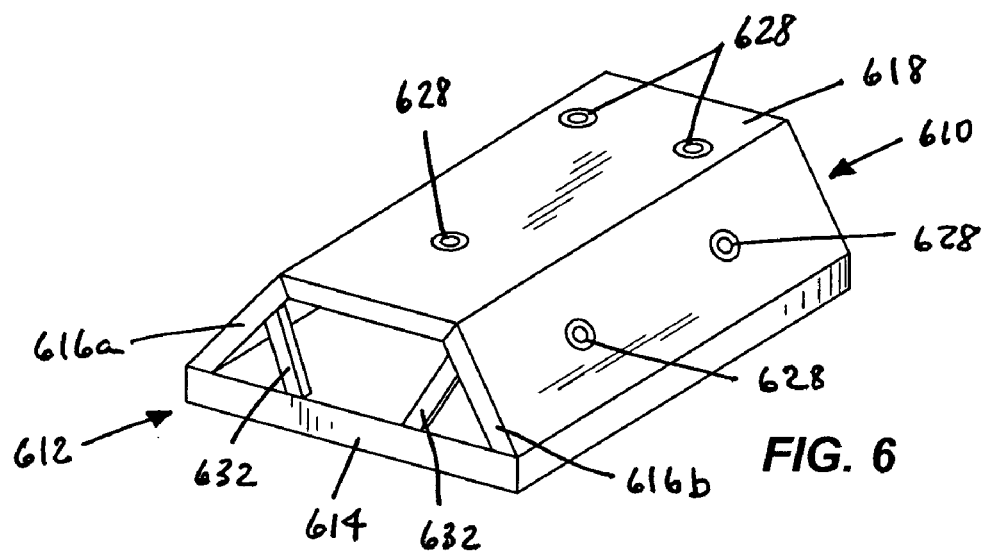
FIG. 6 is a perspective view of a surgical training device according to another embodiment of the invention.
Figure 7A:
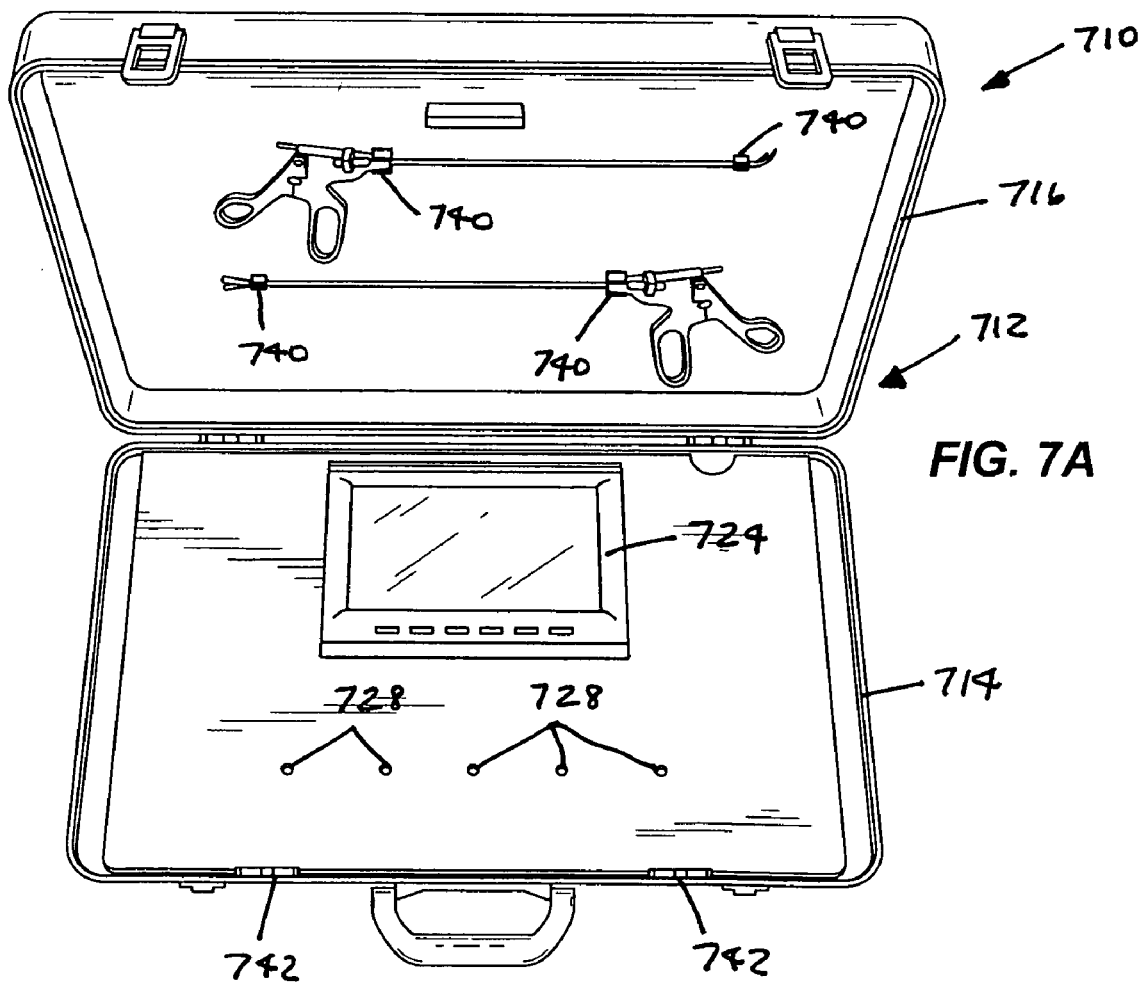
FIGS. 7A-7D are various perspective views of a surgical training device according to another embodiment of the invention.
Figure 7B:
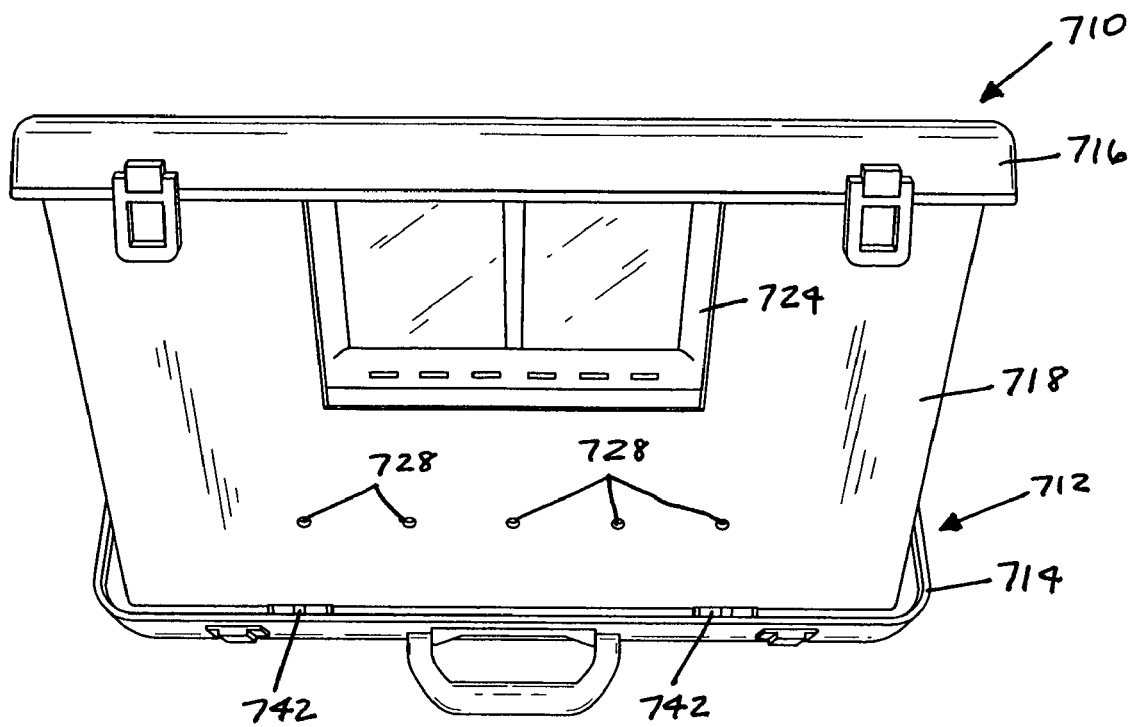
Figure 7C:
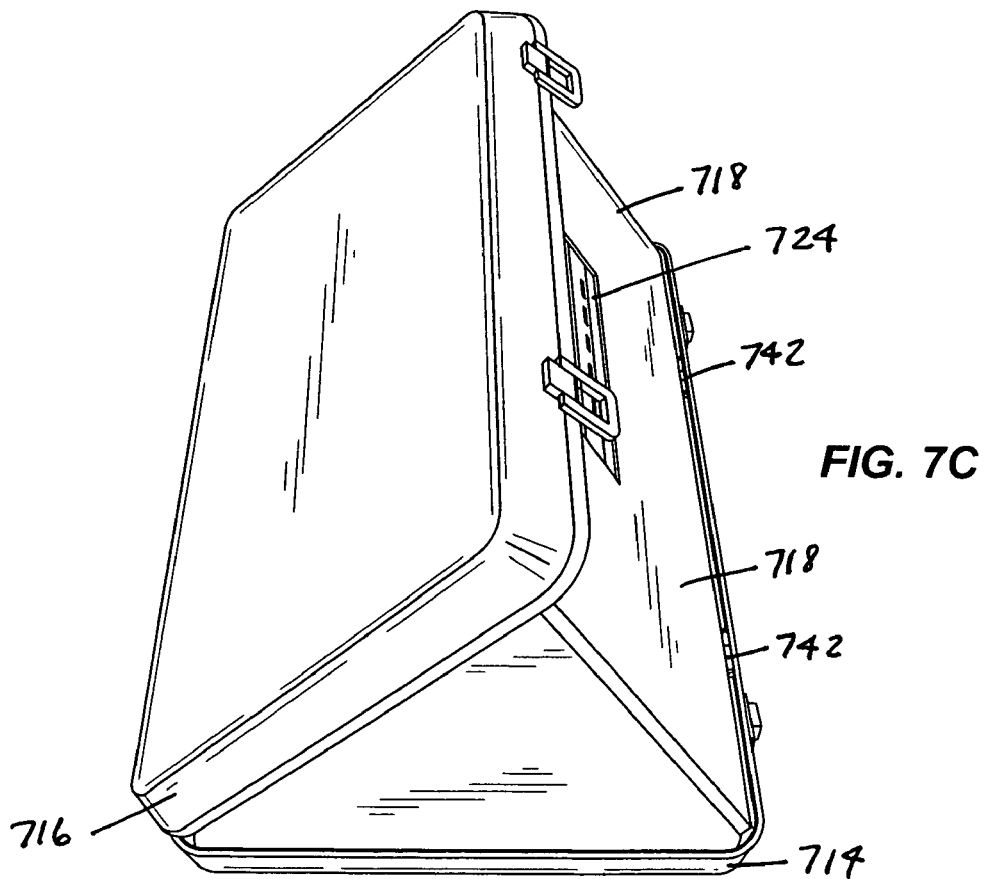
Figure 7D:
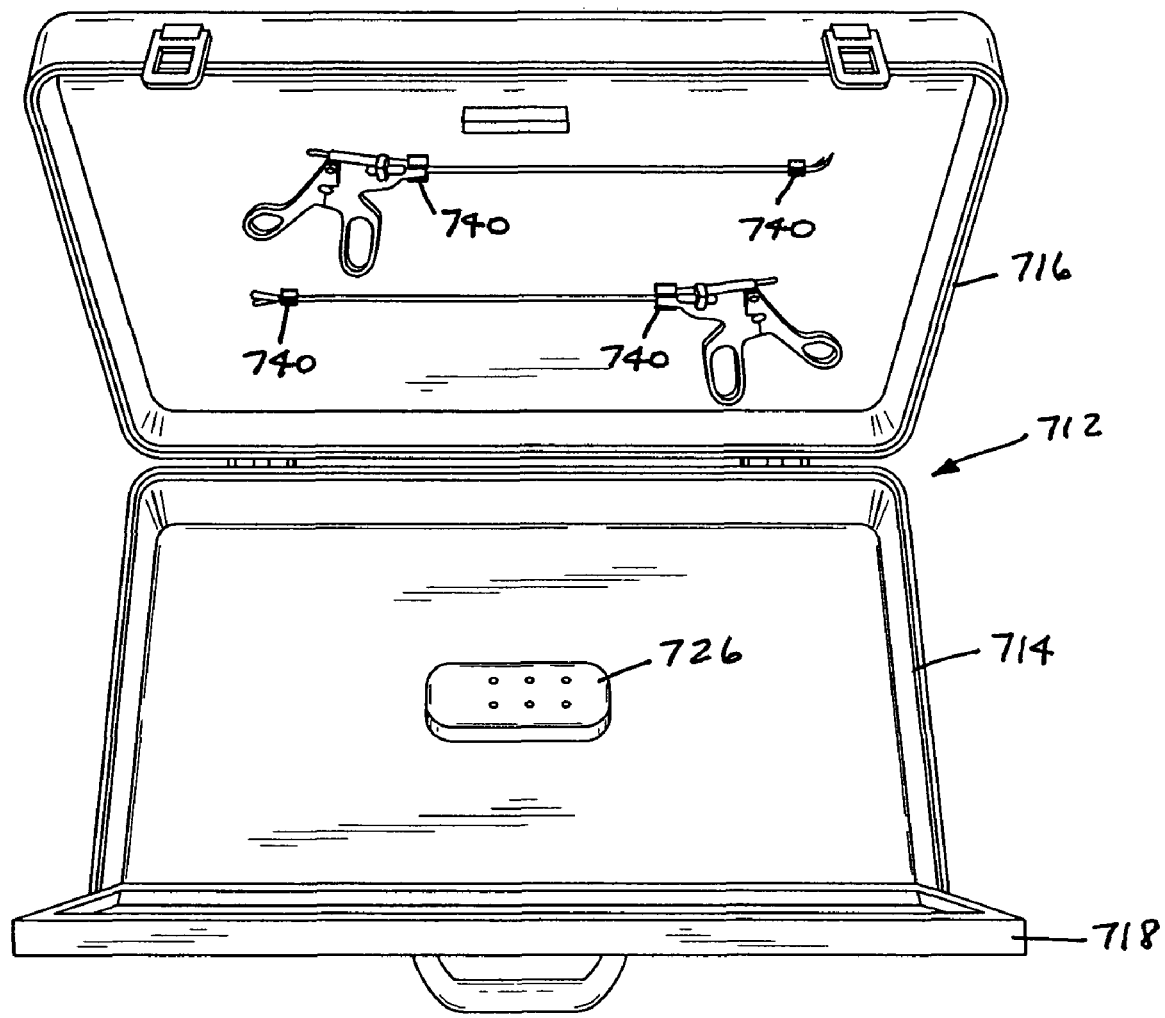

FIG. 6 illustrates a surgical training device 610 according to another embodiment of the invention. The surgical training device 610 can include a case 612 having a base 614, a first lid section 616a, a second lid section 616b, and a top section 618. The first lid section 616a and the second lid section 616b can be opened about hinges and can be secured by support bars 632 at acute angles with respect to the base 614. The top edges of the first section 616a and the second section 616b can be coupled to the top section 618. The surgical training device 610 can include a camera (not shown), a light source (not shown), a video monitor (not shown), a simulated specimen (not shown), and ports 628. The ports 628 can be positioned in one or more of the first lid section 616a, the second lid section 616b, and the top section 618. The simulated specimen or exercise objects can be inserted in a space below the first lid section 616a, the second lid section 616b, and the top section 618.

FIGS. 7A-7D illustrate a surgical training device 710 according to another embodiment of the invention. The surgical training device 710 can include a case 712 having a base 714 and a lid 716. In some embodiments, the case 712 is a folding portable briefcase that can integrate all of the components necessary for a student to practice suturing and other surgical techniques by himself or herself. The lid 716 can include one or more brackets 740 to which laparoscopic or other surgical instruments can be attached for storage and transport. The surgical training device 710 can include a diagonal support 718, a camera (not shown), a light source (not shown), a video monitor 724, a simulated specimen 726, and ports 728. The diagonal support 718 can be rotated about one or more hinges 742 from the position shown in FIG. 7A to the position shown in FIG. 7C.

In any one of the embodiments described above, the surgical training device can include two cameras in order to practice working against camera to adjust for perceived reversal of movement. In any one of the embodiments described above, the lid can include an output and/or speakers. The output can be connected to a PDA, an iPod, a portable media site, optical storage, magnetic storage, flash media, etc.

In any one of the embodiments described above, the case can be a folding portable briefcase that can integrate all of the components necessary for a student to practice suturing and other surgical techniques by himself or herself. In any of the embodiments described above, the light source can be a conventional bulb, a florescent bulb, or one or more light-emitting diodes. In any of the embodiments described above, the power to the camera and/or the video monitor can be main line power, rechargeable batteries, and/or non-rechargeable batteries (e.g., a 9-Volt battery).

In some embodiments, the ports can be holes with a diameter of about 5 mm to about 15 mm. A rubberized disc can be inserted in one or more of the ports so that real trocars can be used. The rubberized disc and the hole can include a cruciate-shaped opening to also allow the use of instruments without trocars. In some embodiments, a membrane strip constructed of neoprene, rubber, or plastic can be positioned in the ports so that trocars can be inserted.

The video monitor can be a seven to twelve inch liquid crystal display (LCD) (although other sizes may be suitable). In some embodiments, the video monitor can include a recording device, such as hard drive memory, high definition, MPEG-4 recording devices, or MPEG-2 recording devices. In some embodiments, the video monitor can be capable of displaying picture-in-picture, a split screen, or can include two separate screens in order to display both the output from the camera and training videos, tutorials, or instructions. In some embodiments, a student can stop and start the training video, tutorial, or instructions using a foot pedal, a voice activator, or another type of hands-free device. In some embodiments, the video monitor is connected to or integrated with a DVD player, optical storage media, another suitable digital video player and/or recorder (e.g., for formats such as Archos, Apple iPod video, etc.). In some embodiments, the video monitor includes a LCD personal computer/television with external connectors for S-video, VGA, BBI, etc. to provide computer playback on the screen for instructions. In some embodiments, the video monitor can include a tablet personal computer. In some embodiments, the output from the camera can be transmitted to a remote location for viewing by a supervisor or professor. The camera can be an analog video camera, a digital video camera, a webcam, and/or a three-dimensional video camera. In some embodiments, the surgical training device can include more than one camera in order to simulate different surgical styles or zones (e.g., one camera positioned in the VERTICAL ZONE® and one camera positioned according to a traditional contralateral configuration). In one embodiment, the surgical training device does not include a video monitor or a camera, but rather is connected to an industrial laparoscopic camera and video system. In one embodiment, the video monitor can be implemented into a three-dimensional video monitor or a three-dimensional head-mounted display that can be worn by the student. In one embodiment, the video monitor is not included within the case, but is connected to the camera and mounted or positioned outside of the case. In some embodiments, the surgical training device can include a timer.

In general, the simulated tissue does not need to have realistic tissue characteristics. In some embodiments, a surgical glove or balloon filled with foam or sponge can serve as the simulated tissue. The surgical training devices of each embodiment of the invention are effective, in part, due to the port positions accurately reproducing the hand, wrist, and arm ergonomics that are directly transferrable to actual surgery. Rather than the ports being positioned on flat surfaces so that the instruments enter vertically, some embodiments of the invention provide ports that are positioned so that the instruments enter horizontally. Some embodiments of the invention are designed to simulate reproductive organ surgery. Some embodiments of the invention lead the student by video tutorials and/or videos of real surgeries that allow the student to copy the arm movements for suturing, dissecting, and other surgical movements.

Various additional features and advantages of the invention are set forth in the following claims.

The invention claimed is:

1. A surgical training device for use by a surgeon being trained to perform surgery on a patient from a left side or a right side of the patient, the surgeon being trained with surgical instruments and simulated tissue, the surgical training device comprising:

a portable case including a base and a lid;

a support coupled to the base, the support moveable from a first position stored within the base to a second position, the support including a plurality of ports positioned so that when the support is in the second position, the surgical instruments inserted into the plurality of ports are substantially horizontal and parallel to the base while moving toward the simulated tissue;

a first camera, a second camera, and a third camera coupled to the support, the first camera being positioned on a first side of the support, the second camera being positioned on a second side of the support, the first side of the support being opposite from the second side of the support, the third camera being positioned in a central portion of the support between the first side and the second side; and a video monitor embedded in the support and connected to the first camera, the second camera, and the third camera, the video monitor displaying an output including at least one of the surgical instruments and the simulated tissue;

the video monitor displaying the surgical instruments from multiple surgical positions including a right side ipsilateral surgical position that is performed with the surgeon standing and having both hands on the right side of the patient based on the first camera, a left side ipsilateral surgical position that is performed with the surgeon standing and having both hands on the left side of the patient based on the second camera, and a contralateral surgical position that is performed with the surgeon having one hand on the left side of the patient and one hand on the right side of the patient based on the third camera.

2. The surgical training device of claim 1 wherein each one of the plurality of ports has a diameter of about 5 mm to about 15 mm.

3. The surgical training device of claim 1 wherein each one of the plurality of ports includes a rubberized disc with at least one of a round opening and a cruciate-shaped opening.

4. The surgical training device of claim 1 wherein each one of the plurality of ports includes a membrane strip constructed of at least one of neoprene, rubber, and plastic.

5. The surgical training device of claim 1 wherein the video monitor includes at least one liquid crystal display.

6. The surgical training device of claim 1 wherein the video monitor is connected to a video recorder.

7. The surgical training device of claim 1 wherein the video monitor displays at least one of picture-in-picture and a split screen to display the output from one of the first camera, the second camera, and the third camera and at least one of training videos, tutorials, and instructions.

8. The surgical training device of claim 7 and further comprising a hands-free device for starting and stopping the at least one of training videos, tutorials, and instructions.

9. The surgical training device of claim 8 wherein the hands-free device includes one of a foot pedal and a voice activator.

10. The surgical training device of claim 1 wherein the video monitor includes at least one of a digital video player, a digital video recorder, and optical storage media.

* * * * *